United States Patent
Izawa et al.

(10) Patent No.: US 10,590,812 B2
(45) Date of Patent: Mar. 17, 2020

(54) SLIDING MECHANISM

(71) Applicant: NISSAN MOTOR CO., LTD., Yokohama-shi, Kanagawa (JP)

(72) Inventors: Yoshinori Izawa, Kanagawa (JP); Yutaka Mabuchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/117,297

(22) PCT Filed: Jan. 16, 2015

(86) PCT No.: PCT/JP2015/051048
§ 371 (c)(1),
(2) Date: Aug. 8, 2016

(87) PCT Pub. No.: WO2015/118924
PCT Pub. Date: Aug. 13, 2015

(65) Prior Publication Data
US 2016/0348545 A1     Dec. 1, 2016

(30) Foreign Application Priority Data
Feb. 10, 2014 (JP) ................ 2014-023548

(51) Int. Cl.
*F01L 3/02* (2006.01)
*C22C 9/00* (2006.01)
(Continued)

(52) U.S. Cl.
CPC ............. *F01L 3/02* (2013.01); *C22C 9/00* (2013.01); *C23C 8/20* (2013.01); *C23C 8/22* (2013.01);
(Continued)

(58) Field of Classification Search
CPC ....... F01L 3/02; F01L 3/14; F01L 3/16; F01L 2101/00; C23C 8/22; C23C 8/26;
(Continued)

(56) References Cited

U.S. PATENT DOCUMENTS 3,632,697 A * 1/1972 Finlay .................. B22F 1/0007
264/0.5
3,930,894 A * 1/1976 Shapiro .................... C22C 9/02
148/554

(Continued)

FOREIGN PATENT DOCUMENTS

CN      1806059 A       7/2006
CN      100344781 C     10/2007
(Continued)

*Primary Examiner* — Jacob M Amick
*Assistant Examiner* — Charles Brauch
(74) *Attorney, Agent, or Firm* — Foley & Lardner LLP

(57) ABSTRACT

A sliding mechanism 1 includes a first sliding member 10 and a partner second sliding member 20 configured to slide relative to the first sliding member 10. The first sliding member 10 includes a matrix phase 11 and a hard phase 13 that is harder than the matrix phase 11, in which the hard phase 13 is embedded in the matrix phase 11 in a dispersed state. The second sliding member 20 includes a base 21 and a surface-treatment layer 23 that is formed on the sliding surface 20 of the base 21 and is harder than the matrix phase 11.

20 Claims, 12 Drawing Sheets

(51) Int. Cl.
*F01L 3/08* (2006.01)
*C23C 8/20* (2006.01)
*C23C 8/24* (2006.01)
*C23C 8/22* (2006.01)
*C23C 8/26* (2006.01)
*C23C 24/00* (2006.01)
*C23C 30/00* (2006.01)
*F01L 3/14* (2006.01)
*F01L 3/16* (2006.01)

(52) U.S. Cl.
CPC ............... *C23C 8/24* (2013.01); *C23C 8/26* (2013.01); *C23C 24/00* (2013.01); *C23C 30/005* (2013.01); *F01L 3/08* (2013.01); *F01L 3/14* (2013.01); *F01L 3/16* (2013.01); *F01L 2101/00* (2013.01); *F16C 2202/04* (2013.01); *F16C 2202/20* (2013.01); *F16C 2204/12* (2013.01); *F16C 2204/14* (2013.01); *F16C 2204/60* (2013.01); *F16C 2206/04* (2013.01); *F16C 2223/12* (2013.01); *F16C 2223/14* (2013.01); *F16C 2240/00* (2013.01); *F16C 2240/06* (2013.01); *F16C 2360/22* (2013.01)

(58) Field of Classification Search
CPC ......... C23C 30/005; C23C 24/00; C22C 9/00; F02L 3/08
See application file for complete search history.

(56) References Cited

U.S. PATENT DOCUMENTS

| | | | |
|---|---|---|---|
| 6,039,785 A | 3/2000 | Dalal et al. | |
| 6,161,528 A * | 12/2000 | Akao | F28D 19/041 123/568.12 |
| 2003/0031579 A1 * | 2/2003 | Shikata | B22F 3/26 419/2 |
| 2004/0161625 A1 * | 8/2004 | Sakai | B22F 1/0003 428/553 |
| 2006/0108029 A1 | 5/2006 | Kawasaki et al. | |
| 2007/0292711 A1 | 12/2007 | Uneo et al. | |
| 2008/0283353 A1 * | 11/2008 | Holderied | C22C 9/04 192/107 M |
| 2009/0116921 A1 * | 5/2009 | Naumann | B21H 7/185 409/131 |
| 2009/0176034 A1 * | 7/2009 | Ruuttu | B23K 26/0084 427/566 |
| 2010/0001231 A1 * | 1/2010 | Loukus | B22F 3/227 252/182.12 |
| 2011/0146448 A1 * | 6/2011 | Fujitsuka | C22C 1/1084 75/237 |
| 2012/0080240 A1 * | 4/2012 | Green | B24D 99/005 175/428 |

FOREIGN PATENT DOCUMENTS

| | | |
|---|---|---|
| CN | 101115863 A | 1/2008 |
| JP | 50-148207 A | 11/1975 |
| JP | 5-230566 A | 9/1993 |
| JP | 8-170655 A | 7/1996 |
| JP | 8-199328 A | 8/1996 |
| JP | 9-256821 A | 9/1997 |
| JP | 2001-500567 A | 1/2001 |
| JP | 2005-256146 A | 9/2005 |
| JP | 2008-274873 A | 11/2008 |
| JP | 2012-87620 | 5/2012 |
| JP | 2012-225203 A | 11/2012 |
| WO | WO 2006/075219 A2 | 7/2006 |

* cited by examiner (A)

(B)

×500

(A)

(A)

(B)

SLIDING MECHANISM

TECHNICAL FIELD

The present invention relates to a sliding mechanism. In more detail, the present invention relates to a sliding mechanism with both high high-temperature abrasion resistance and high heat conductivity.

BACKGROUND ART

A heat-resistant copper alloy that has high strength, high abrasion resistance and high corrosion resistance at a high temperature range has been proposed for use as high-temperature sliding members used in valve guides, valve sheets and the like of internal combustion engines (see Patent Document 1).

The heat-resistant copper alloy contains, for example, 18 to 35 wt % Zn, 1 to 5 wt % Mn, 0.3 to 5 wt % Al, 0.001 to 0.5 wt % Sb, 0.1 to 4 wt % one or more of Fe, Ni and Co, and the remainder of Cu and inevitable impurities.

In the heat-resistant copper alloy, Fe forms solid solution with base Cu so that the crystal grains of the alloy are refined in order to improve strength.

CITATION LIST

Patent Literature

Patent Document 1: JP H05-230566A

SUMMARY OF INVENTION

Technical Problem

However, the heat-resistant copper alloy described in Patent Document 1 has a heat conductivity of approximately from 60 to 110 W/m·K since copper forms solid solution with zinc and the like in the alloy. Therefore, a problem is that the heat conductivity is much lower than that of pure copper although it is still high compared to those of iron-based sintered bodies.

Further, the melting point is low compared to that of pure copper since copper forms solid solution with zinc and the like in the alloy. Therefore, another problem is that adhesion to a partner member easily occurs in a high-temperature environment, and the high-temperature abrasion resistance is poor.

The present invention has been made in view of the above-described problems with the prior art. It is an object of the present invention to provide a sliding mechanism that has both high high-temperature abrasion resistance and high heat conductivity.

Solution to Problem

The present inventors conducted a keen study for achieving the above-described object. As a result, they found that the object can be achieved by providing a predetermined first sliding member and a predetermined partner second sliding member configured to slide relative to the first sliding member. The present invention was thus completed.

That is, the sliding mechanism of the present invention includes a first sliding member and a partner second sliding member that slides relative to the first sliding member.

The first sliding member consists of a matrix phase and a hard phase that is harder than the matrix phase, in which the hard phase is embedded in the matrix phase in a dispersed state. The matrix phase is composed of copper or a copper alloy (which is neither a brass-based alloy nor a bronze-based alloy), and the hard phase is composed of an iron alloy.

The second sliding member is harder than the matrix phase.

Advantageous Effects of Invention

In the present invention, the sliding mechanism includes the first sliding member and the partner second sliding member configured to slide relative to the first sliding member, wherein the first sliding member consists of the matrix phase and the hard phase that is harder than the matrix phase, in which the hard phase is embedded in the matrix phase in a dispersed state, and wherein the matrix phase is composed of copper or a copper alloy (which is neither a brass-based alloy nor a bronze-based alloy), the hard phase is composed of an iron alloy, and the second sliding member is harder than the matrix phase.

With this configuration, it becomes possible to provide a sliding mechanism that has both high high-temperature abrasion resistance and high heat conductivity.

DESCRIPTION OF EMBODIMENTS

Figure 1:
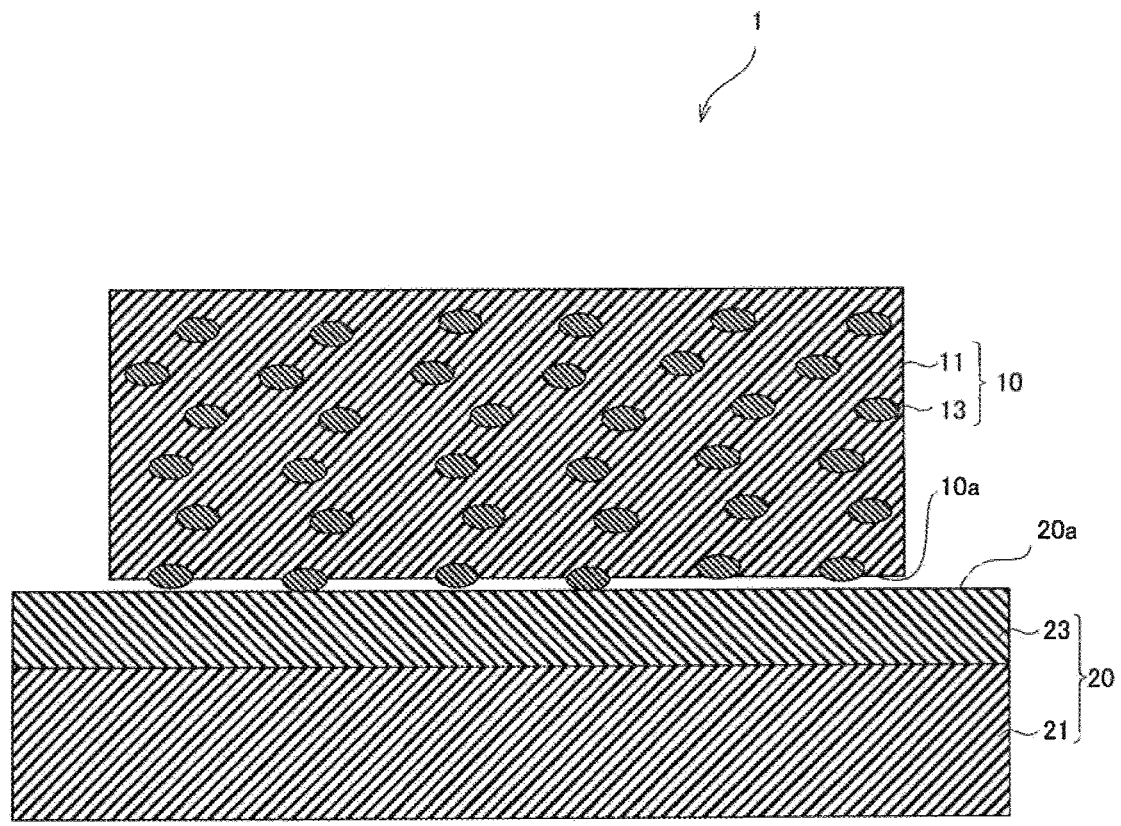
FIG. 1 is a cross sectional view schematically illustrating an example of a sliding mechanism according to a first embodiment of the present invention.

Hereinafter, a sliding mechanism according to an embodiment of the present invention will be described in detail referring to the drawings. The dimension of the drawings referred to in the following embodiments may be exaggerated for descriptive reasons and may thus be different from the actual dimension.

First Embodiment

FIG. 1 is a cross sectional view schematically illustrating an example of a sliding mechanism according to a first embodiment of the present invention. As illustrated in FIG. 1, the sliding mechanism 1 of this example includes a first sliding member 10 and a second sliding member 20. The second sliding member 20 is a partner member that slides relative to the first sliding member 10.

The first sliding member 10 includes a matrix phase 11 and a hard phase 13 that is harder than the matrix phase 11. The hard phase 13 is embedded in the matrix phase 11 in a dispersed state. In other word, an independent plurality of hard phases 13 is mixed in a continuous matrix phase 11. In this example, the hard phase 13 is exposed in a sliding surface 10*a* and further protrudes outward so that the sliding surface 10*a* of the first sliding member 10 has an uneven shape.

The second sliding member 20 includes a base 21 and a surface-treatment layer 23 formed on a sliding surface 20*a* of the base 21. The surface-treatment layer 23 is harder than the first sliding member 10.

With this configuration, high high-temperature abrasion resistance and high heat conductivity can be achieved at the same time. However, it is not essential for the present invention that the hard phase is exposed in the sliding surface and further protrudes outward so that the sliding surface of the first sliding member has an uneven shape. Further, it is not essential for the present invention that the surface-treatment layer that is harder than the first sliding member is formed on the sliding surface of the base.

At present, it is considered that the advantageous effect is obtained by the following mechanism.

The hard phase embedded in the dispersed state functions like hard grains and thereby ensures the abrasion resistance at a high temperature range while the continuous matrix phase maintains the heat conductivity. As a result, high high-temperature abrasion resistance and high heat conductivity can be achieved at the same time.

However, the above-described mechanism is based on speculation. Therefore, it should be understood well that even when the above-described advantageous effect is obtained by a different mechanism other than the above-described mechanism, such sliding mechanisms are also within the scope of the present invention.

Hereinafter, the individual components will be described in more detail.

It is preferred that the matrix phase 11 is made of neither a brass-based alloy nor a bronze-based alloy that contain zinc in the amount of more than 20 mass % which has a heat conductivity of no more than approximately 110 W/m·K and exhibits an acceptable amount of abrasion only at approximately 550° C. or less. Further, it is preferred that the matrix phase has high heat conductivity and also has high melting point and is less likely to cause adhesion.

For example, the matrix phase is preferably composed of pure copper, however it is not limited thereto and may be composed of a pure copper-based alloy that contains 5 to 20 mass % of a low-melting metal such as zinc or tin. Such pure coppers include, for example, tough pitch copper, phosphorous-deoxidized copper, oxygen-free copper and the like.

The hard phase 13 is not particularly limited and may be composed of any material that is harder than the matrix phase and can be embedded in the matrix phase in a dispersed state. In the present invention, the dispersed state of the hard phase in the matrix phase also includes a state in which the hard phase continues in a dendritic form. However, it is preferred the hard phase is embedded in a more dispersed state. Further, it is preferred that the hard phase is composed of a material that barely forms solid solution with the matrix phase and can be embedded in the matrix phase in a uniformly dispersed state. Further, it is preferred that the hard phase is exposed in the sliding surface and further protrudes outward so that the sliding surface of the first sliding member has an uneven shape since the recesses of the uneven shape can serve as, for example, lubricant reservoirs so as to further reduce adhesion to the partner. The uneven shape may be formed by, for example, adhesive wear of the matrix phase which is comparatively softer than the hard phase. Further, the protruded hard phase of the first sliding member is also advantageous in that it can prevent further abrasion and thereby stabilize the sliding movement relative to the second sliding member. Further, the protruded hard phase of the first sliding member is also advantageous in that it can remove a deposit adhered to the surface of the partner second sliding member, which is derived from the matrix phase of the first sliding member.

When the matrix phase is composed of pure copper or a pure copper-based alloy as described above, it is preferred that the hard phase is composed of, for example, an iron alloy in terms of the melting point, the difference in hardness and the like. However, it is not particularly limited.

The first sliding member 10 as described above is formed, for example, by adding the hard phase material in the process of melting the matrix phase material and smelting it into a matrix phase, in which the hard phase is added in an amount not to be completely dissolved in the matrix phase to form solid solution but to form a different crystal structure as the hard phase. However, the first sliding member is not necessarily produced by this method.

It is preferred that the first sliding member 10 as described above has, for example, a heat conductivity of 140 W/m·K or more, more preferably 200 W/m·K or more. Further, it is preferred that the first sliding member 10 as described above exhibits a low amount of abrasion at a high temperature ranging from 400° C. to 800° C., which is an indicator of high-temperature abrasion resistance.

The base 21 may be composed of any material that is harder than the matrix phase and can be used in a state, in which it is exposed to a high-temperature atmosphere. Further, it is preferred that the base is harder than the first sliding member. For example, such materials include heat-resistant steels known in the art. Such heat-resistant steels include, for example, austenitic steels such as SUH31, SUH35, SUH36, SUH37, SUH38, SUH309, SUH310, SUH330, SUH660 and SUH661, ferritic steels such as SUH21, UH409, SUH409L and SUH446, martensitic steels such as SUH1, SUH3, SUH4, SUH11, SUH600 and SUH616, which are defined in G4311 or G4312 of Japanese Industrial Standards, and the like.

The surface-treatment layer 23 may be constituted by any layer that is harder than the first sliding member. Such layers include, for example, a nitride layer, a carburized layer, a chromium (Cr) plating layer, a diamond-like carbon (DLC) coating layer and the like. These layers may be applied alone or in combination.

Figure 2:
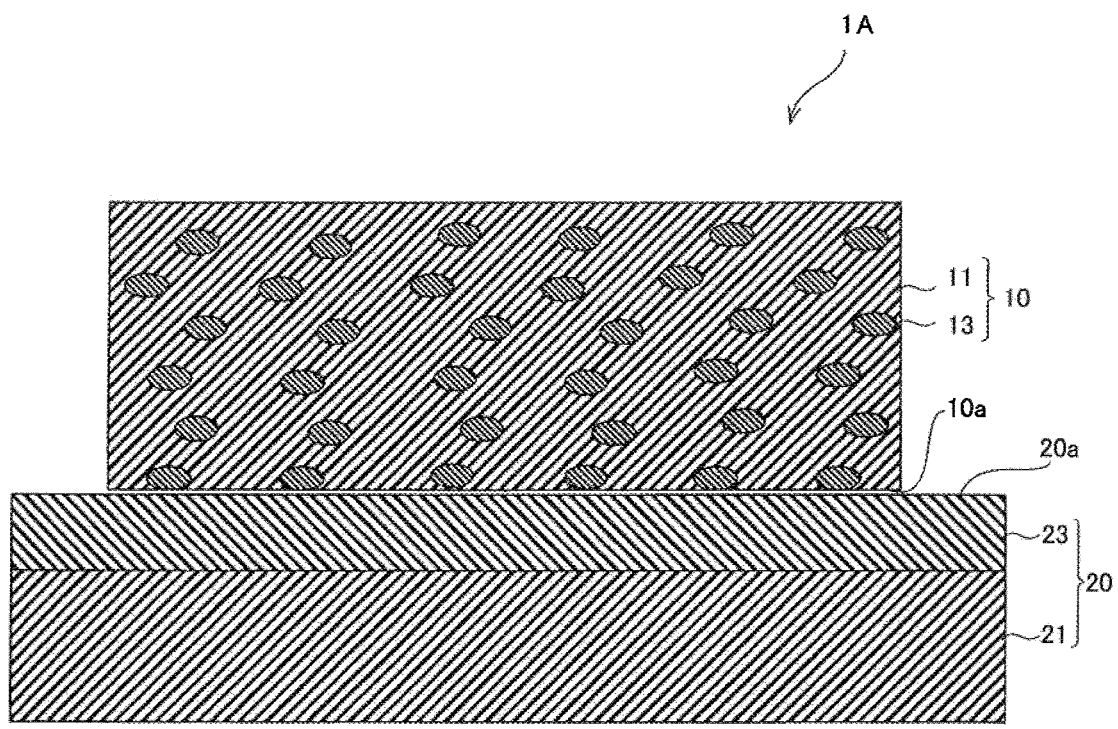
FIG. 2 is a cross sectional view schematically illustrating another example of the sliding mechanism according to the first embodiment of the present invention.

FIG. 2 is a cross sectional view schematically illustrating another example of the sliding mechanism according to the first embodiment of the present invention. The same reference signs are denoted to the same components as those of the previously-described example, and the description thereof is omitted. As illustrated in FIG. 2, the sliding mechanism 1A of this example is different from that of the previously-described example in that a hard phase 13 of a first sliding member 10 is merely exposed in a sliding surface 10*a*. In other words, the sliding surface 10*a* of the first sliding member 10 is flat.

Also with this configuration, high high-temperature abrasion resistance and high heat conductivity can be achieved at the same time. It is not essential for the present invention that the hard phase is exposed in the sliding surface. For example, even when the hard phase is not exposed in the sliding surface just after the production, the comparatively soft matrix phase of the first sliding member is worn out by a sliding movement between the first sliding member and the second sliding member in the initial use so that the hard phase of the first sliding member is exposed in the sliding surface. As used herein, the "initial use" means, for example, a running-in during a test or a trial after the production. However, it is needless to say that the scope of the present invention encompasses the case in which the hard phase becomes exposed in the sliding surface for the first time in an ordinary use. Further, it is not essential for the present invention that the surface-treatment layer that is harder than the first sliding member is formed on the sliding surface of the base.

Figure 3:
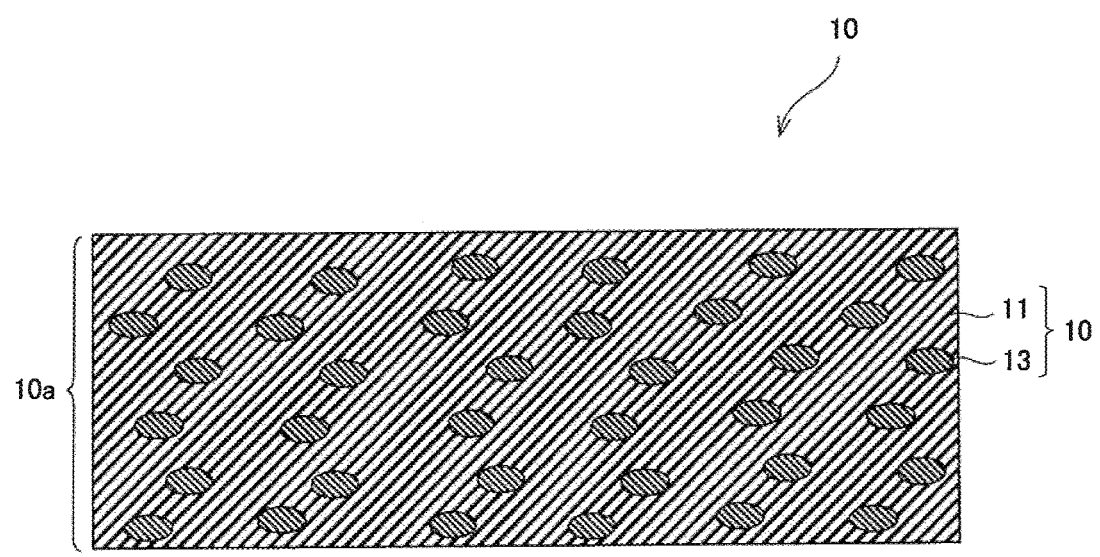
FIG. 3 is a plan view schematically illustrating the sliding surface of an example of a first sliding member of the sliding mechanism according to the first embodiment of the present invention.

FIG. 3 is a plan view schematically illustrating the sliding surface of an example of the first sliding member of the sliding mechanism according to the first embodiment of the present invention. The same reference signs are denoted to the same components as those of the previously-described examples, and the description thereof is omitted. As illustrated in FIG. 3, the first sliding member 10 of this example includes a hard phase 13 that is embedded in a matrix phase 11 in a dispersed state and is exposed in the sliding surface 10a.

With this configuration, higher high-temperature abrasion resistance and higher heat conductivity can be achieved at the same time. In particular, it is preferred that the hard phase is exposed in the sliding surface and further protrudes outward so that the sliding surface of the first sliding member has an uneven shape, since recesses of the uneven shapes can serve as, for example, lubricant reservoirs so as to further reduce adhesion to the partner.

Second Embodiment

Figure 4:
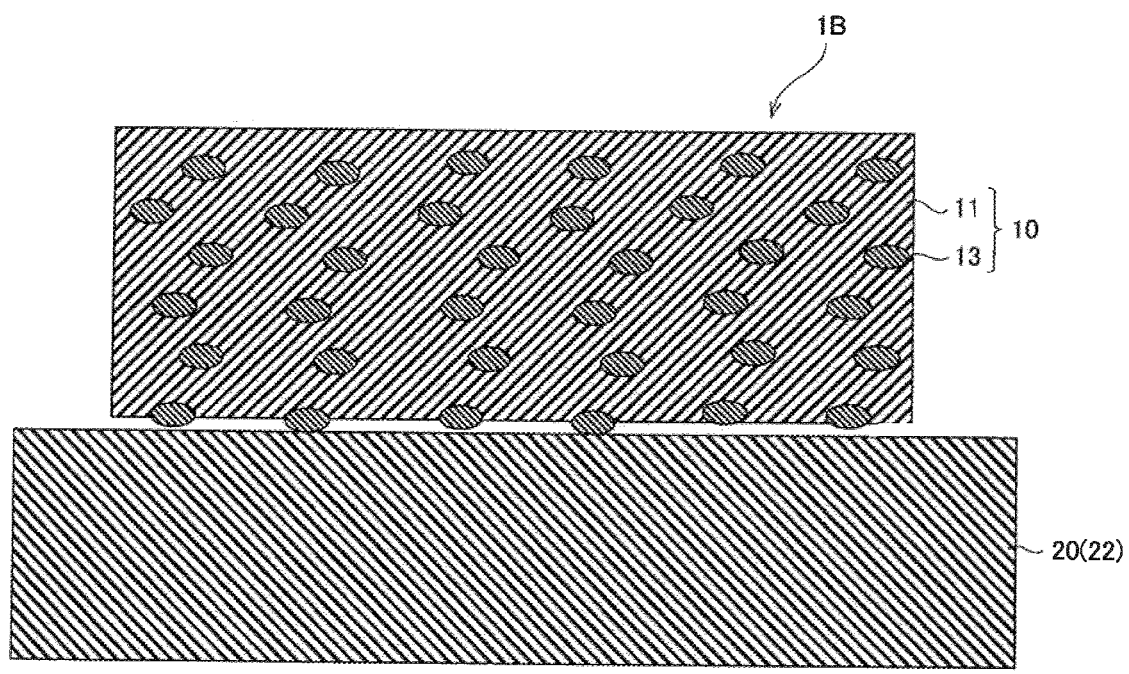
FIG. 4 is a cross sectional view schematically illustrating an example of a sliding mechanism according to a second embodiment of the present invention.

FIG. 4 is a cross sectional view schematically illustrating another example of a sliding mechanism according to a second embodiment of the present invention. The same reference signs are denoted to the same components as those of the above-described embodiment, and the description thereof is omitted. As illustrated in FIG. 4, the sliding mechanism 1B of this example is different from that of the above-described embodiment in that a second sliding member 20 is composed of a base 22 that is harder than a matrix phase 11.

Also with this configuration, high high-temperature abrasion resistance and high heat conductivity can be achieved at the same time.

The base 22 is not particularly limited and may be made of any material that is harder than the first sliding member. In terms of the range of choices of the base, the above-described first embodiment is preferred to this embodiment.

Third Embodiment

Figure 5:
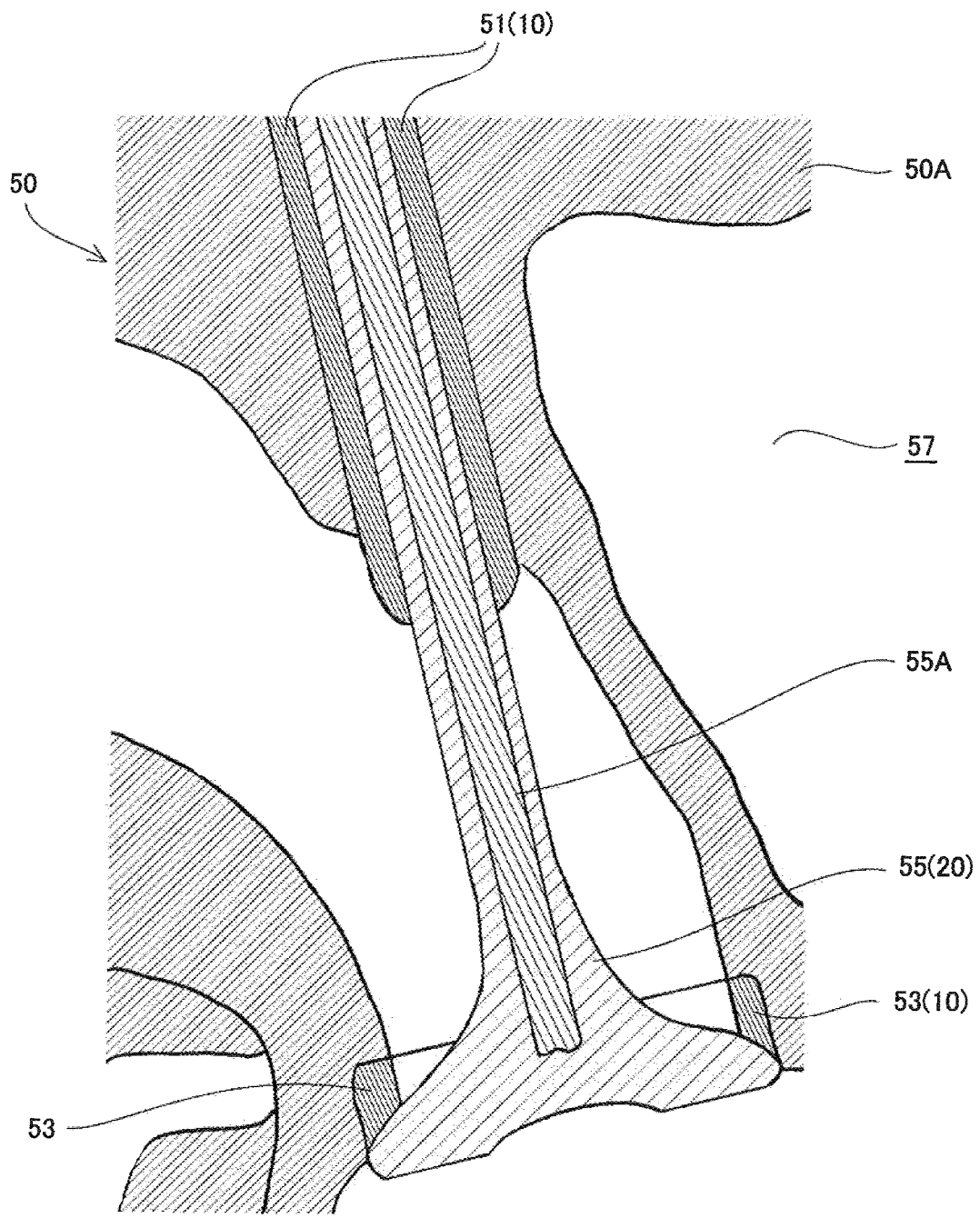
FIG. 5 is a cross sectional view schematically illustrating a sliding mechanism according to a third embodiment of the present invention.

FIG. 5 is a cross sectional view schematically illustrating an example of a sliding mechanism according to a third embodiment of the present invention. The same reference signs are denoted to the same components as those of the above-described embodiments, and the description thereof is omitted. As illustrated in FIG. 5, the sliding mechanism 1C of this example includes a valve guide 51 and a valve sheet 53 that are integrated in a cylinder head 50A of an internal combustion engine 50 by press-fitting or the like, and a partner valve 55 that slides relative to them. The above-described first sliding member 10 is applied to the valve guide 51 and the valve sheet 53, and the above-described second sliding member 20 is applied to the valve 55.

FIG. 5 illustrates a valve guide, a valve sheet and a valve disposed in the exhaust side. Further, in FIG. 5, the reference sign 55A is denoted to metallic sodium enclosed in the valve. Although not shown in the figure, the present invention is also applicable to a sliding mechanism that is composed of either one of a valve guide and a valve sheet, and a valve. Further, although not shown in the figure, the present invention is also applicable to a sliding mechanism disposed in the inlet side, which is composed of a valve guide, a valve sheet, a valve and the like.

In the sliding mechanism 1C of this example, the valve guide 51 and the valve sheet 53 are partly exposed to a high-temperature atmosphere during use. Further, the sliding mechanism 1C of this example includes a cooling unit 57 configured to directly or indirectly cool the valve guide 51 and the valve sheet 53 by means of the cylinder head 50A (or an integrated cylinder block (not shown)) and the valve 55 disposed around the valve guide 51 and the valve sheet 53. The cooling unit 57 has at least one cooling function selected from the group consisting of water (liquid) cooling, oil cooling and air cooling. In this example, the cooling unit 57 has an air cooling function. The metallic sodium enclosed in the valve contributes not only to reducing knocking of the valve itself but also to cooling That is, the valve guide 51, the valve sheet 53, the valve 55, a predetermined cooling unit (not shown) and the like cooperate with each other so as to function as the sliding mechanism 1C of this example.

Thank to this configuration, the sliding mechanism has both high high-temperature abrasion resistance and high heat conductivity even when the valve guide and a valve sheet corresponding to the first sliding member are partly exposed to a high temperature in a poorly lubricated condition in which oil films, which is formed by supplying a lubricant such as lubrication oil, cannot be maintained. For example, an application of an internal combustion engine with this sliding mechanism to a vehicle can improve the fuel efficiency.

EXAMPLES

Hereinafter, the present invention will be described in more detail with examples and comparative examples.

Example 1

As listed in Table 1, a mixture of a matrix phase material and a hard phase material, which was composed of copper (Cu) 69.3 mass %, iron (Fe) 29.2 mass % and the remaining inevitable impurities 1.5 mass %, was smelted. A block first sliding member of this example was thus obtained. The result of an analysis using an electron beam micro analyzer (EPMA) showed that the matrix phase of the first sliding member was composed of a copper alloy in which a minute amount of iron (Fe) was contained as solid solution while the hard phase was composed of an iron alloy. The hardness of the first sliding member was Hv 210.

On the other hand, a nitride layer was formed on the sliding surface of a ring base of SUH35 by means of a nitriding treatment. A ring second sliding member of this example was thus obtained. The hardness of the surface-treatment layer of the second sliding member was Hv 830.

Example 2

The same first sliding member as that of Example 1 was used as a block first sliding member of this example.

On the other hand, a chromium (Cr) plating layer was formed on the sliding surface of a ring base of SUH35 by means of chromium (Cr) plating. A ring second sliding member of this example was thus obtained. The hardness of the surface-treatment layer of the second sliding member was Hv 850.

Example 3

The same first sliding member as that of Example 1 was used as a block first sliding member of this example.

On the other hand, a diamond-like carbon (DLC) coating layer was formed on the sliding surface of a ring base of SUH35. A ring second sliding member of this example was thus obtained. The hardness of the surface-treatment layer of the second sliding member was Hv 1300.

Example 4

The same first sliding member as that of Example 1 was used as a block first sliding member of this example.

On the other hand, a carburized layer was formed on the sliding surface of a ring base of SUH35 by means of a carburizing treatment. A ring second sliding member of this example was thus obtained. The hardness of the surface-treatment layer of the second sliding member was Hv 830.

Example 5

The same first sliding member as that of Example 1 was used as a block first sliding member of this example.

On the other hand, a ring base of SUH35 was used as a ring second sliding member of this example without any surface treatment on the sliding surface. The hardness of the surface-treatment layer of the second sliding member was Hv 370.

Example 6

As listed in Table 1, a mixture of a matrix phase material and a hard phase material, which was composed of copper (Cu) 69.3 mass %, iron (Fe) 29.2 mass % and the remaining inevitable impurities 1.5 mass %, was smelted. A block first sliding member of this example was thus obtained. The result of an analysis using an EPMA showed that the matrix phase of the first sliding member was composed of a pure copper-based alloy while the hard phase was composed of an iron alloy. The hardness of the first sliding member was Hv 210.

On the other hand, a nitride layer was formed on the sliding surface of a ring base of SUH35 by means of a nitriding treatment. A ring second sliding member of this example was thus obtained. The hardness of the surface-treatment layer of the second sliding member was Hv 500.

Figure 6A:
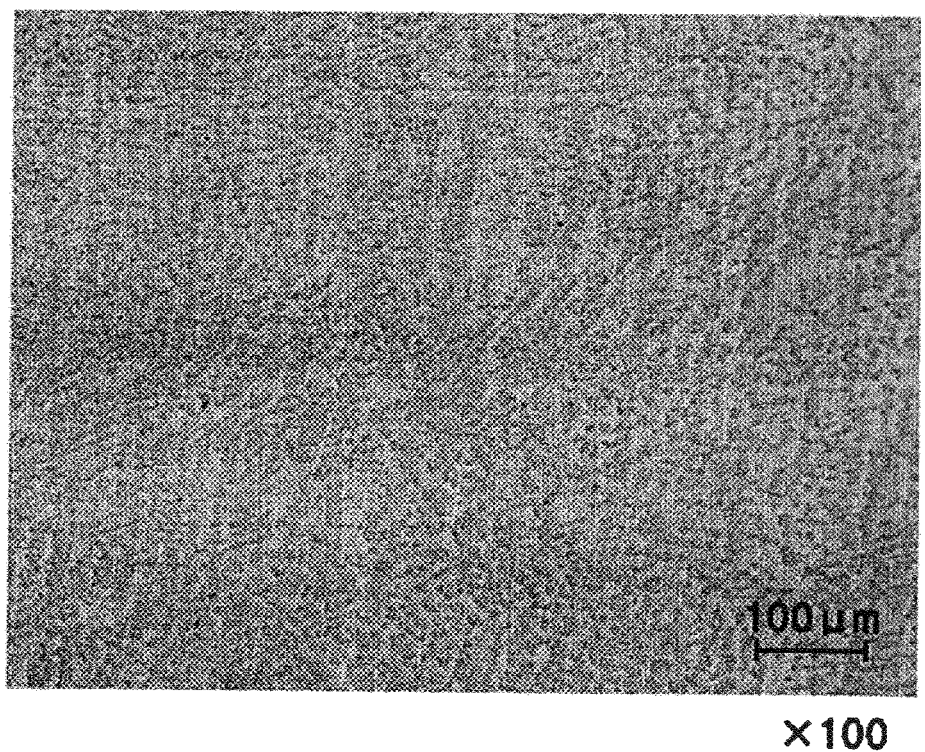
FIG. 6A and FIG. 6B are photographs of the metallographic structure of a first sliding member of Example 6.
Figure 6B:
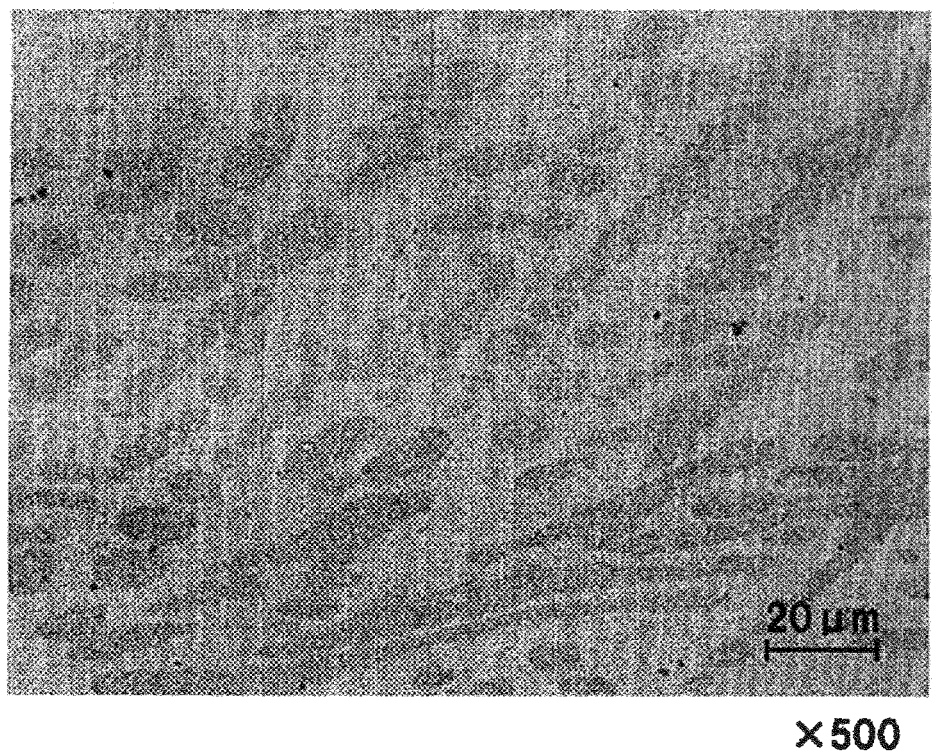

FIG. 6A and FIG. 6B are photographs (magnification: 100) and (magnification: 500) of the metallographic structure of the first sliding member of Example 6. As shown in FIG. 6A and FIG. 6B, the structure of the first sliding member of Example 6 was such that the hard phase of an iron alloy was embedded in the continuous matrix phase of a pure copper-based alloy in the form of an independent plurality of grains.

Example 7

As listed in Table 1, a mixture of a matrix phase material and a hard phase material, which was composed of copper (Cu) 89.7 mass %, iron (Fe) 9.5 mass % and the remaining inevitable impurities 0.8 mass %, was smelted. A block first sliding member of this example was thus obtained. The result of an analysis using an EPMA showed that the matrix phase of the first sliding member was composed of a copper alloy in which a minute amount of iron (Fe) was contained as solid solution, while the hard phase was composed of an iron alloy. The hardness of the first sliding member was Hv 210.

On the other hand, the same second sliding member as that of Example 6 was used as a ring second sliding member of this example.

Figure 7A:
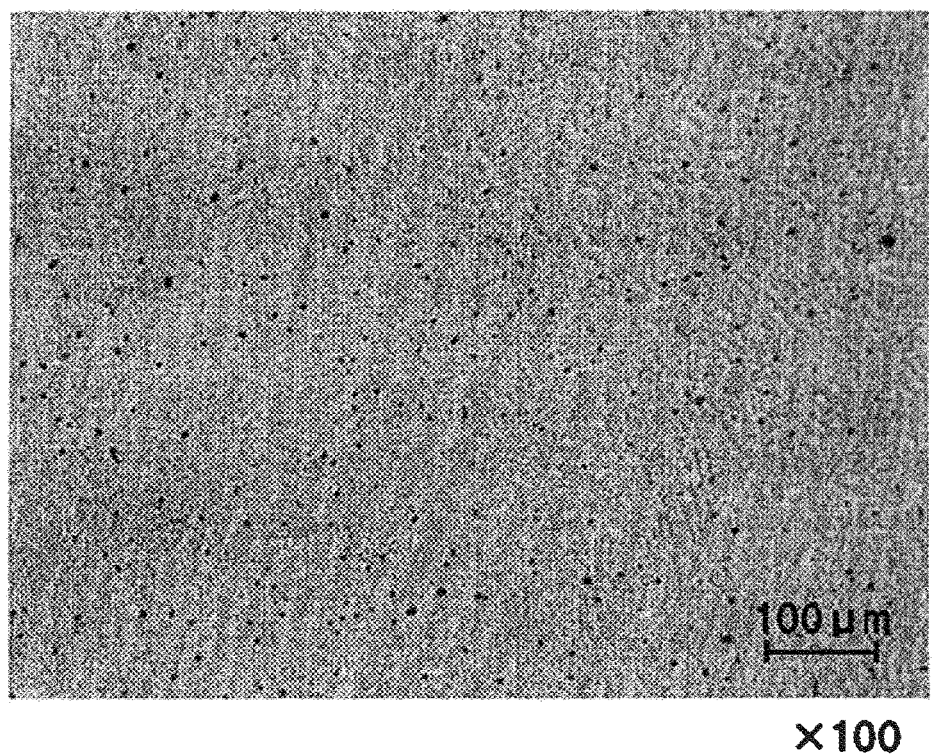
FIG. 7A and FIG. 7B are photographs of the metallographic structure of a first sliding member of Example 7.
Figure 7B:
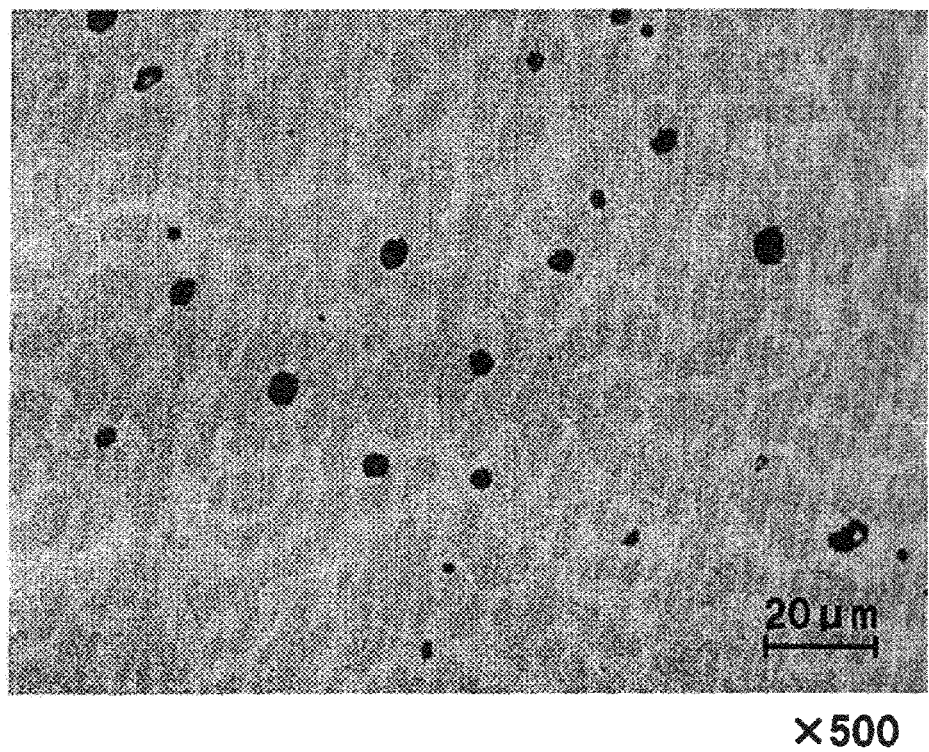

FIG. 7A and FIG. 7B are photographs (magnification: 100) and (magnification: 500) of the metallographic structure of the first sliding member of Example 7. As shown in FIG. 7A and FIG. 7B, the structure of the first sliding member of Example 7 was also such that the continuous matrix phase of a copper alloy contained a minute amount of Fe as solid solution, and the hard phase of an iron alloy was embedded in the matrix phase in the form of an independent plurality of grains.

Example 8

As listed in Table 1, a mixture of a matrix phase material and a hard phase material, which was composed of copper (Cu) 49.5 mass %, iron (Fe) 49.3 mass % and the remaining inevitable impurities 1.2 mass %, was smelted. A block first sliding member of this example was thus obtained. The result of an analysis using EPMA showed that the matrix phase of the first sliding member was composed of a pure copper-based alloy, while the hard phase was composed of an iron alloy. The hardness of the first sliding member was Hv 210.

On the other hand, the same second sliding member as that of Example 6 was used as a ring second sliding member of this example.

Figure 8A:
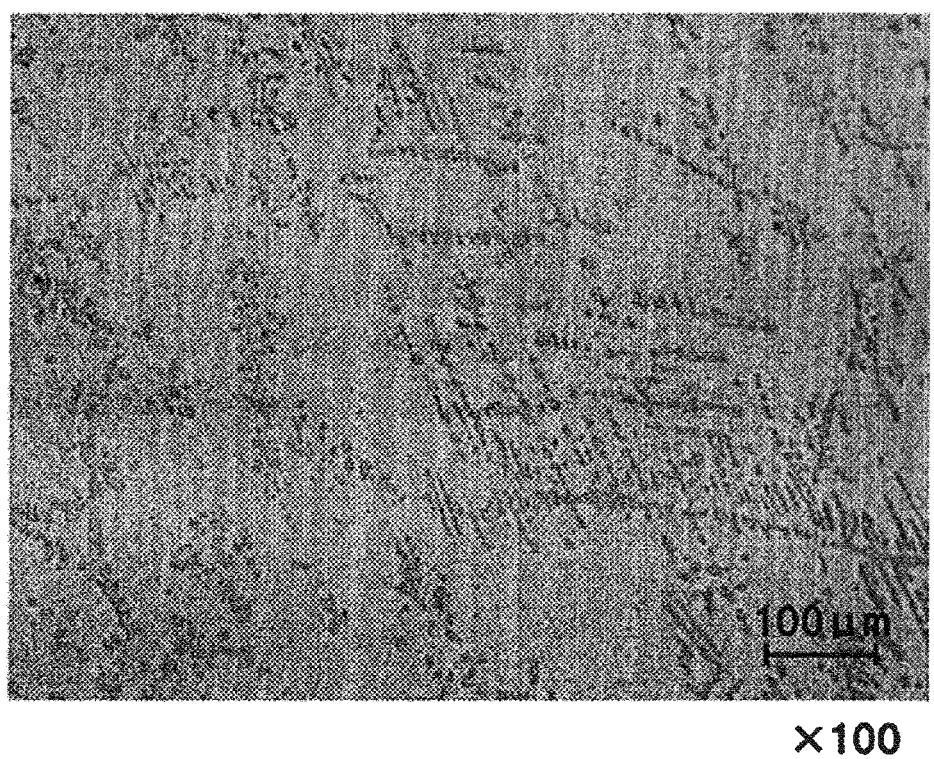
FIG. 8A and FIG. 8B are photographs of the metallographic structure of a first sliding member of Example 8.
Figure 8B:
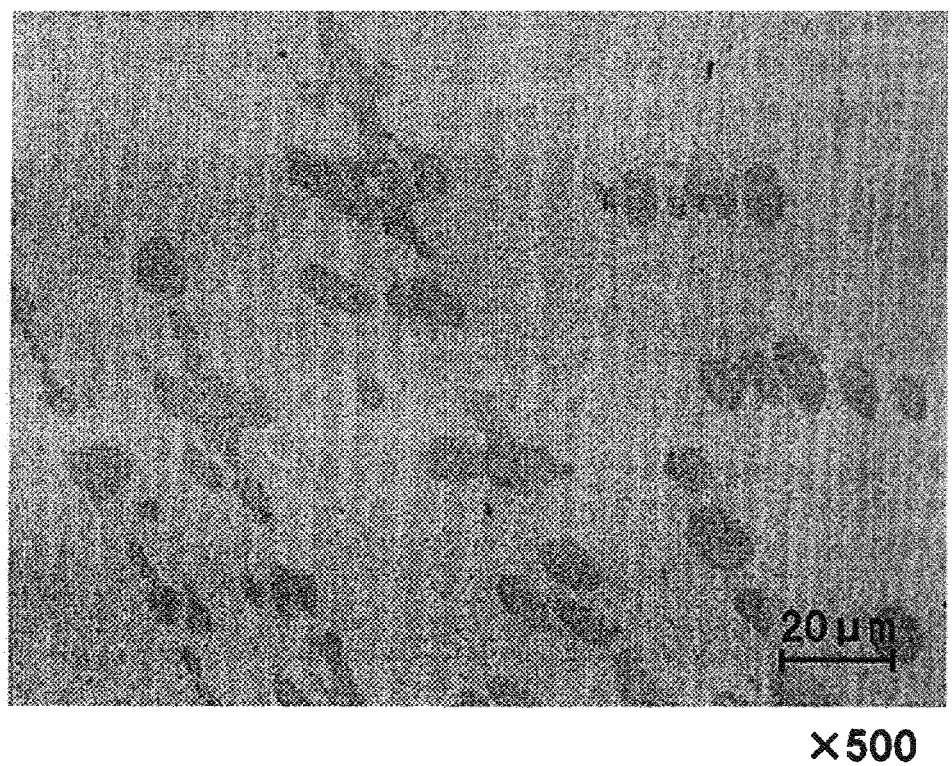

FIG. 8A and FIG. 8B are photographs (magnification: 100) and (magnification: 500) of the metallographic structure of the first sliding member of Example 8. As shown in FIG. 8A and FIG. 8B, the structure of first sliding member of Example 8 was also such that the hard phase of an iron alloy was embedded in the continuous matrix phase of a pure copper-based alloy in the form of an independent plurality of grains.

Comparative Example 1

As listed in Table 1, a mixture of a matrix phase material and a hard phase material, which was composed of copper (Cu) 58.2 mass %, zinc (Zn) 36.7 mass %, manganese (Mn) 1.5 mass %, silicon (Si) 0.6 mass %, aluminum (Al) 1.5 mass % and the remaining inevitable impurities 1.5 mass %, was smelted. A block first sliding member of this comparative example was thus obtained. The result of an analysis using an EPMA showed that the matrix phase of the first sliding member was composed of a brass-based alloy while the hard phase was composed of an intermetallic compound $Mn_5Si_3$ (hereinafter also referred to as "MnSi"). The hardness of the first sliding member was Hv 150.

On the other hand, the same second sliding member as that of Example 6 was used as a ring second sliding member of this comparative example.

Comparative Example 2

The same first sliding member as that of Comparative example 1 was used as a block first sliding member of this comparative example.

Further, the same second sliding member as that of Example 2 was used as a ring second sliding member of this comparative example.

Comparative Example 3

The same first sliding member as that of Comparative example 1 was used as a block first sliding member of this comparative example.
Further, a ring base of SUH 35 was used as a ring second sliding member of this example without any surface treatment on the sliding surface. The hardness of the second sliding member was Hv 370.

Comparative Example 4

As listed in Table 1, a mixture of a matrix phase material and a hard phase material, which was composed of copper (Cu) 62.3 mass %, zinc (Zn) 29.3 mass % manganese (Mn) 3.1 mass %, silicon (Si) 1 mass %, aluminum (Al) 2.9 mass %, chromium (Cr) 0.15 mass % and the remaining inevitable impurities 1.25 mass %, was smelted. A block first sliding member of this comparative example was thus obtained. A metallographic observation and the result of an analysis using an EPMA showed that the matrix phase of the first sliding member was composed of a brass-based alloy while the hard phase was composed of an intermetallic compound MnSi. The hardness of the first sliding member was Hv 120.
Further, the same second sliding member as that of Example 6 was used as a ring second sliding member of this comparative example.

Comparative Example 5

As listed in Table 1, a mixture of a matrix phase material and a hard phase material, which was composed of copper (Cu) 68.5 mass %, tin (Sn) 28.7 mass % and the remaining inevitable impurities 2.8 mass %, was smelted. A block first sliding member of this comparative example was thus obtained. A metallographic observation and the result of an analysis using an EPMA showed that the matrix phase of the first sliding member was composed of a bronze-based alloy while the hard phase was composed of a compound such as copper sulfide (hereinafter also referred to as "sulfides"). The hardness of the first sliding member was Hv 150.
Further, the same second sliding member as that of Example 6 was used as a ring second sliding member of this comparative example.

Comparative Example 6

As listed in Table 1, a mixture of a matrix phase material and a hard phase material, which was composed of copper (Cu) 52 mass %, zinc (Zn) 29.3 mass %, manganese (Mn) 0.8 mass %, aluminum (Al) 1 mass %, iron (Fe) 15.3 mass % and the remaining inevitable impurities 1.6 mass %, was smelted. A block first sliding member of this comparative example was thus obtained. A metallographic observation and the result of an analysis using an EPMA showed that the matrix phase of the first sliding member was composed of a brass-based alloy while the hard phase was composed of MnSi and an iron alloy. The hardness of the first sliding member was Hv 130.
Further, the same second sliding member as that of Example 6 was used as a ring second sliding member of this comparative example.

Comparative Example 7

As listed in Table 1, a material, which was composed of copper (Cu) 98.2 mass % and the remaining inevitable impurities 1.8 mass %, was smelted. Further, dimples were formed in the surface at the same time. A ring first sliding member of this comparative example was thus obtained. A metallographic observation and the result of an analysis using an EPMA showed that the matrix phase of the first sliding member was composed of a pure copper-based alloy while the hard phase was not formed. The hardness of the first sliding member was 80 HRB.
On the other hand, the same second sliding member as that of Example 6 was used as a ring second sliding member of this comparative example.
The specifications of the sliding mechanisms of the examples and comparative examples, each of which is composed of a first sliding member and a second sliding member, are listed in Table 1.

TABLE 1

| | First Sliding Member* Composition (mass %) | | | | | | | | |
|---|---|---|---|---|---|---|---|---|---|
| | Cu | Zn | Sn | Mn | Si | Al | Cr | Fe | Inevitable Impurities |
| Example 1 | 69.3 | | | | | | | 29.2 | 1.5 |
| Example 2 | 69.3 | | | | | | | 29.2 | 1.5 |
| Example 3 | 69.3 | | | | | | | 29.2 | 1.5 |
| Example 4 | 69.3 | | | | | | | 29.2 | 1.5 |
| Example 5 | 69.3 | | | | | | | 29.2 | 1.5 |
| Example 6 | 69.3 | | | | | | | 29.2 | 1.5 |
| Example 7 | 89.7 | | | | | | | 9.5 | 0.8 |
| Example 8 | 49.5 | | | | | | | 49.3 | 1.2 |
| Comparative example 1 | 58.2 | 36.7 | | 1.5 | 0.6 | 1.5 | | | 1.5 |
| Comparative example 2 | 58.2 | 36.7 | | 1.5 | 0.6 | 1.5 | | | 1.5 |
| Comparative example 3 | 58.2 | 36.7 | | 1.5 | 0.6 | 1.5 | | | 1.5 |
| Comparative example 4 | 62.3 | 29.3 | | 3.1 | 1 | 2.9 | 0.15 | | 1.25 |
| Comparative example 5 | 68.5 | | 28.7 | | | | | | 2.8 |
| Comparative example 6 | 52 | 29.3 | | 0.8 | | 1 | | 15.3 | 1.6 |

TABLE 1-continued

| | | | | | | |
|---|---|---|---|---|---|---|
| Comparative example 7 | 98.2 | | | | | 1.8 |

| | First Sliding Member* | | | Second Sliding Member | | |
|---|---|---|---|---|---|---|
| | Matrix Phase Type | Hard Phase Type | Hardness | Base | Surface-Treatment Layer | Hardness |
| Example 1 | Copper Alloy | Iron Alloy | Hv 210 | SUH35 | Nitride Layer | Hv 830 |
| Example 2 | Copper Alloy | Iron Alloy | Hv 210 | SUH35 | Cr Plate Layer | Hv 850 |
| Example 3 | Copper Alloy | Iron Alloy | Hv 210 | SUH35 | DLC Coating | Hv 1300 |
| Example 4 | Copper Alloy | Iron Alloy | Hv 210 | SUH35 | Carburized Layer | Hv 830 |
| Example 5 | Copper Alloy | Iron Alloy | Hv 210 | SUH35 | None | Hv 370 |
| Example 6 | Pure Copper-Based Alloy | Iron Alloy | Hv 210 | SUH35 | Nitride Layer | Hv 500 |
| Example 7 | Copper Alloy | Iron Alloy | Hv 210 | SUH35 | Nitride Layer | Hv 500 |
| Example 8 | Pure Copper-Based Alloy | Iron Alloy | Hv 210 | SUH35 | Nitride Layer | Hv 500 |
| Comparative example 1 | Brass-Based Alloy | MnSi | Hv 150 | SUH35 | Nitride Layer | Hv 500 |
| Comparative example 2 | Brass-Based Alloy | MnSi | Hv 150 | SUH35 | Cr Plate Layer | Hv 850 |
| Comparative example 3 | Brass-Based Alloy | MnSi | Hv 150 | SUH35 | None | Hv 370 |
| Comparative example 4 | Brass-Based Alloy | MnSi | Hv 120 | SUH35 | Nitride Layer | Hv 500 |
| Comparative example 5 | Bronze-Based Alloy | Sulfides | Hv 150 | SUH35 | Nitride Layer | Hv 500 |
| Comparative example 6 | Brass-Based Alloy | MnSi + Iron alloy | Hv 130 | SUH35 | Nitride Layer | Hv 500 |
| Comparative example 7 | Pure Copper-Based Alloy | None | 80 HRB | SUH35 | Nitride Layer | Hv 500 |

*The first sliding member of Comparative example 7 has dimples on the sliding surface.

(Performance Evaluation)

Figure 9:
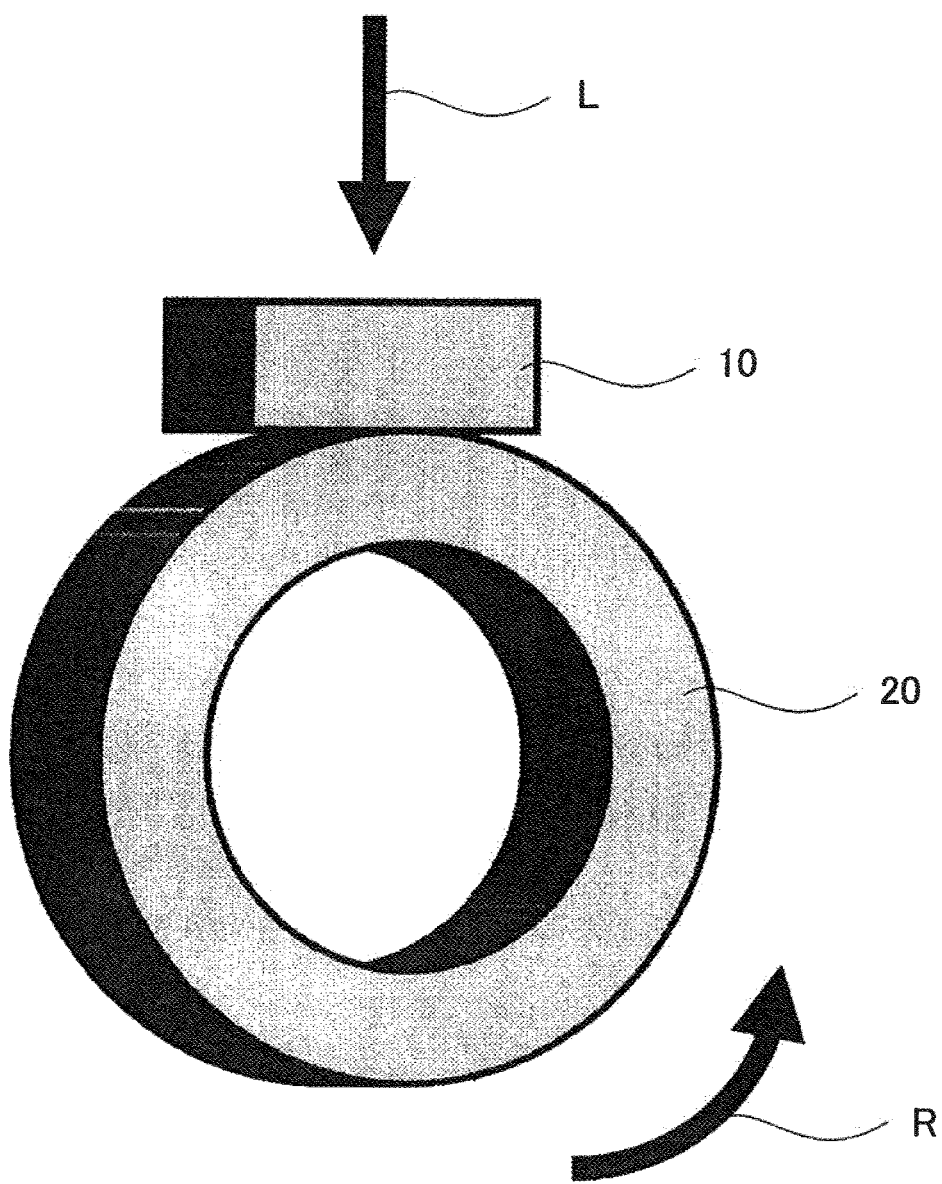
FIG. 9 is an explanatory perspective view illustrating a summary of an abrasion test.

An abrasion test using a block-on-ring friction and abrasion tester was conducted in the following test conditions for the sliding mechanisms of the examples and the comparative examples, each of which was composed of a first sliding member and a second sliding member. Specifically, as illustrated in FIG. 9, while a ring second sliding member 20 was placed on a block first sliding member 10 and was pressed against the partner first sliding member 10 with a load in the direction illustrated by the arrow L, the second sliding member 20 was rotated in the direction illustrated by the arrow R. After the test, the amount of abrasion was measured.

(Test Conditions)

Block first sliding member: 10 mm×10 mm×20 mm

Ring second sliding member: φ100 mm

Testing temperature: 400° C. to 800° C.

Load type: 200 N

Test time: 30 min

The results obtained are shown in Table 2. Further, the heat conductivities of the first sliding members are also shown in Table 2.

TABLE 2

| | Amount of Abrasion (mm³/30 min) | | | | | | | | Heat Conductivity of First Sliding |
|---|---|---|---|---|---|---|---|---|---|
| | 400° C. | 450° C. | 500° C. | 550° C. | 600° C. | 650° C. | 700° C. | 800° C. | Member (W/m · K) |
| Example 1 | — | — | 1.8 | — | 3.5 | 4.5 | 5.8 | 7.2 | 205 |
| Example 2 | — | — | — | — | — | — | 4.7 | — | 205 |
| Example 3 | — | — | — | — | — | — | 4.8 | — | 205 |
| Example 4 | — | — | — | — | — | — | 7.8 | — | 205 |
| Example 5 | — | — | — | — | — | — | 9.3 | — | 205 |
| Example 6 | — | — | — | — | — | — | 4.8 | — | 205 |
| Example 7 | — | — | — | — | — | — | — | — | 213 |
| Example 8 | — | — | — | — | — | — | — | — | 147 |
| Comparative Example 1 | 12 | — | — | 16.5 | 32 | 202 | 760 | — | 110 |

TABLE 2-continued

| | Amount of Abrasion (mm³/30 min) | | | | | | | | Heat Conductivity of First Sliding |
|---|---|---|---|---|---|---|---|---|---|
| | 400° C. | 450° C. | 500° C. | 550° C. | 600° C. | 650° C. | 700° C. | 800° C. | Member (W/m · K) |
| Comparative example 2 | — | — | — | — | — | 167 | — | — | — |
| Comparative example 3 | 16.7 | 21 | 25.2 | 134.2 | — | — | — | — | — |
| Comparative example 4 | — | — | — | — | — | — | — | — | 80.9 |
| Comparative example 5 | — | — | — | — | 22.8 | — | — | — | 57 |
| Comparative example 6 | — | — | — | — | — | 110 | — | — | 43 |
| Comparative example 7 | — | — | — | — | — | 89.3 | — | — | 289 |

As can be seen from Table 1 and Table 2, Example 1 to Example 8, which are within the scope of the present invention, have both high high-temperature abrasion resistance and high heat conductivity compared to Comparative example 1 to Comparative example 7, which are outside of the scope of the present invention.

Comparing Example 1 with Comparative example 6, for example, revealed that Comparative example 6, which contains an iron alloy as the hard phase but includes the matrix phase of the first sliding member that is composed of a brass-based alloy containing zinc of a low-melting metal, has low high-temperature abrasion resistance and low heat conductivity.

Comparing Example 1 with Example 5, for example, revealed that Example 1, which includes the second sliding member having a harder nitride layer as the surface-treatment layer, has both higher high-temperature abrasion resistance and higher heat conductivity.

Comparing Example 1 with Comparative example 7, for example, revealed that Example 1, which includes the first sliding member that is made of a pure copper-based alloy with the hard phase embedded therein, has both high high-temperature abrasion resistance and high heat conductivity, although the heat conductivity is slightly lower than that of Comparative example 7, which includes the first sliding member that is made of a pure copper-based alloy but includes no hard phase and has dimples on the sliding surface.

Comparing Example 6 to Example 8 with one another, for example, revealed that the heat conductivity decreases with an increase of the ratio of the hard phase in the first sliding member.

Further, as can be seen from Table 1, Table 2 and FIG. 6A, FIG. 6B, FIG. 8A and FIG. 8B, when the matrix phase is made of a pure copper-based alloy and the hard phase is made of an iron alloy, the mass ratio of copper to the total mass of copper and iron in the first sliding member is preferably from 0.5 to 0.95 in terms of the heat conductivity. When the ratio is less than 0.5, the hard phase present in a dispersed state may not effectively improve high-temperature abrasion resistance. When the ratio is more than 0.95, the hard phase may not be able to present in a dispersed state. In this case, the discontinuous matrix phase may not effectively improve the heat conductivity.

At present, Example 1 to Example 7 are likely to produce good results in the points that the amount of abrasion, which is an indicator of high-temperature abrasion resistance, is equal to or less than 10 mm³/30 min and the heat conductivity, which is an indicator of heat conduction property, is equal to or greater than 200 W/m·K.

While the present invention is described with some embodiments and examples, the present invention is not limited thereto, and a variety of changes can be made within the gist of the present invention.

For example, the embodiments and examples are not limited to the respective configurations described in the above-described embodiments and examples. For example, the type of the matrix phase and the type of the hard phase of the first sliding member and the hardness of the second sliding member may be changed. Further, the configurations of the embodiments and examples may be changed from the above-described combinations in the embodiments and examples.

Further, for example, the first sliding member may be formed by casting the material and further forming it into an almost final shape by means of plastic forming such as wire drawing and forging, and then finishing it into a final product by machining. The first sliding member may be hardened in the plastic forming.

REFERENCE SIGNS LIST 1, 1A to 1C Sliding mechanism
10 First sliding member
10a Sliding surface
11 Matrix phase
13 Hard phase
20 Second sliding member
20a Sliding surface
21, 22 Base
23 Surface-treatment layer
50 Internal combustion engine
50A Cylinder head
51 Valve guide
53 Valve sheet
55 Valve
55A Metallic sodium
57 Cooling unit

The invention claimed is:

1. A sliding mechanism for an internal combustion engine, comprising:
   a first sliding member comprising at least one of a valve guide or a valve sheet of the internal combustion engine; and
   a partner second sliding member comprising a valve of the internal combustion engine and configured to slide relative to the first sliding member, wherein the first sliding member consists of a continuous matrix phase and a hard phase that is harder than the continuous matrix phase, in which the hard phase is embedded in the continuous matrix phase in a dispersed state, the continuous matrix phase is composed of
a copper alloy that contains iron as solid solution, or
a copper alloy that contains iron as solid solution and zinc or tin in an amount of 5 to 20 mass %, the hard phase is composed of an iron alloy, the second sliding member is harder than the continuous matrix phase, and a mass ratio of copper to a total mass of copper and iron in the first sliding member is from 0.5 to 0.95.

2. The sliding mechanism according to claim 1, wherein the hard phase of the first sliding member is exposed in a sliding surface of the first sliding member.

3. The sliding mechanism according to claim 1, wherein the second sliding member or a surface-treatment layer formed on a sliding surface of the second sliding member is harder than the first sliding member.

4. The sliding mechanism according to claim 3, wherein the surface-treatment layer is composed of at least one layer selected from the group consisting of a nitride layer, a carburized layer, a chromium plating layer and a diamond-like carbon coating layer.

5. The sliding mechanism according to claim 1, further comprising:
a cooling unit disposed around the first sliding member, the cooling unit configured to directly or indirectly cool the first sliding member, wherein
the cooling unit has at least one cooling function selected from the group consisting of water cooling, oil cooling and air cooling, and
the first sliding member is configured to be partly exposed to a high-temperature atmosphere during use.

6. The sliding mechanism according to claim 2, wherein the second sliding member or a surface-treatment layer formed on a sliding surface of the second sliding member is harder than the first sliding member.

7. The sliding mechanism according to claim 6, wherein the surface-treatment layer is composed of at least one layer selected from the group consisting of a nitride layer, a carburized layer, a chromium plating layer and a diamond-like carbon coating layer.

8. The sliding mechanism according to claim 2, further comprising:
a cooling unit disposed around the first sliding member, the cooling unit configured to directly or indirectly cool the first sliding member, wherein
the cooling unit has at least one cooling function selected from the group consisting of water cooling, oil cooling and air cooling, and
the first sliding member is configured to be partly exposed to a high-temperature atmosphere during use.

9. The sliding mechanism according to claim 3, further comprising:
a cooling unit disposed around the first sliding member, the cooling unit configured to directly or indirectly cool the first sliding member, wherein
the cooling unit has at least one cooling function selected from the group consisting of water cooling, oil cooling and air cooling, and
the first sliding member is configured to be partly exposed to a high-temperature atmosphere during use.

10. The sliding mechanism according to claim 4, further comprising:
a cooling unit disposed around the first sliding member, the cooling unit configured to directly or indirectly cool the first sliding member, wherein
the cooling unit has at least one cooling function selected from the group consisting of water cooling, oil cooling and air cooling, and
the first sliding member is configured to be partly exposed to a high-temperature atmosphere during use.

11. The sliding mechanism according to claim 6, further comprising:
a cooling unit disposed around the first sliding member, the cooling unit configured to directly or indirectly cool the first sliding member, wherein
the cooling unit has at least one cooling function selected from the group consisting of water cooling, oil cooling and air cooling, and
the first sliding member is configured to be partly exposed to a high-temperature atmosphere during use.

12. The sliding mechanism according to claim 7, further comprising:
a cooling unit disposed around the first sliding member, the cooling unit configured to directly or indirectly cool the first sliding member, wherein
the cooling unit has at least one cooling function selected from the group consisting of water cooling, oil cooling and air cooling, and
the first sliding member is configured to be partly exposed to a high-temperature atmosphere during use.

13. The sliding mechanism according to claim 1, wherein the continuous matrix phase is composed of a copper alloy that contains iron as solid solution and zinc in an amount of 5 to 20 mass %.

14. The sliding mechanism according to claim 1, wherein the continuous matrix phase is composed of a copper alloy that contains iron as solid solution and tin in an amount of 5 to 20 mass %.

15. The sliding mechanism according to claim 1, wherein
the continuous matrix phase is composed of the copper alloy that contains iron as solid solution,
the copper alloy contains iron as solid solution in copper; and
the copper is selected from the group consisting of tough pitch copper, phosphorous-deoxidized copper, and oxygen-free copper.

16. The sliding mechanism according to claim 1, wherein the first sliding member has a heat conductivity of at least 140 W/m·K.

17. The sliding mechanism according to claim 1, wherein
the second sliding member comprises a base and a surface-treatment layer formed on a sliding surface of the base, and
at least one of the base or the surface-treatment layer is harder than the first sliding member.

18. The sliding mechanism according to claim 17, wherein the base is composed of heat-resistant steel.

19. A sliding mechanism for an internal combustion engine, comprising:
a first sliding member comprising at least one of a valve guide or a valve sheet of the internal combustion engine; and
a partner second sliding member comprising a valve of the internal combustion engine and configured to slide relative to the first sliding member, wherein
the first sliding member comprises a continuous matrix phase and a hard phase that is harder than the continuous matrix phase, in which the hard phase is embedded in the continuous matrix phase in a dispersed state, the continuous matrix phase is comprised of
- a copper alloy that contains iron as solid solution, or
- a copper alloy that contains iron as solid solution and zinc or tin in an amount of 5 to 20 mass %, the hard phase is comprised of an iron alloy,
the second sliding member is harder than the continuous matrix phase, and
a mass ratio of copper to a total mass of copper and iron in the first sliding member is from 0.5 to 0.95.

20. The sliding mechanism according to claim 19, wherein the first sliding member exhibits a relative low level of abrasion at a temperature ranging from 400° C. to 800° C.

\* \* \* \* \*